Oct. 24, 1939.  U. CIAMBERLINI  2,177,244
ANEMOMETER ALTITUDE CORRECTION
Filed Dec. 30, 1937
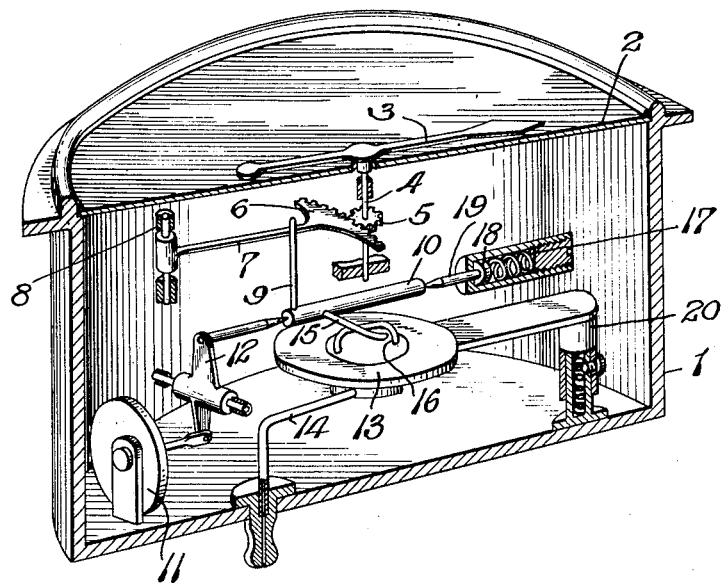
Inventor:
UGO CIAMBERLINI
By Haseltine, Lake & Co.
Attorneys Patented Oct. 24, 1939

2,177,244

UNITED STATES PATENT OFFICE 2,177,244

ANEMOMETER WITH ALTITUDE CORRECTION

Ugo Ciamberlini, Milan, Italy

Application December 30, 1937, Serial No. 182,436
In Italy January 5, 1937

1 Claim. (Cl. 73—2)

It is known that a velocity indicator or anemometer adapted for aircrafts, operating by means of a Pitot tube or a Venturi tube, exposed to the air current produced by the movement of the aircraft, provides measures which are not only dependent from the speed of the aircraft, but depend also from the density of the air and consequently also from the height at which the aircraft is moving. It is therefore obvious that an anemometer which gives correct measures at zero level, will provide increasingly erroneous indications as the height of flight increases.

The present invention has the object of eliminating this inconvenience, by adding thereto a device adapted to compensate as much as possible the errors caused by the different air densities, so as to obtain correct speed indications at all heights of flight.

The invention consists essentially in actuating the index finger moving in front of the indicating dial of the instrument, not only by means of the sole anemometric capsule connected with the Pitot tube, the deformations of which are transmitted to the index finger with a constant ratio of transmission, but with the addition of a second altimetric correcting aneroid capsule acting on said transmission ratio so as to change it at different altitudes. For this purpose, the ordinary anemometric capsule acts on a toothed sector meshing with a pinion of the index finger by means of an arm whose position may be caused to vary with respect to the centre of rotation of said sector, in dependence with the deformations of the added capsule for altimetric correction. The same graduation on the dial may thus serve to indicate with precision the various altitudes.

As on the other hand, the pilots must be able to ascertain with great precision the speed of their machines when flying at a low level, as in the case when the velocity must be small in order to allow of a regular landing or mooring, the invention comprises also other means for allowing to read with more accuracy the small variations of velocity at low altitudes, by spacing further apart the graduations on the dial in correspondence of said low altitudes. To obtain this further object, the transmitting element interposed between the ordinary capsule and the shaft which is displaced longitudinally with respect to itself by the altimetric capsule, is formed by a curved arm projecting from said shaft, having a suitably variable curvature, the point of contact of which with said capsule is caused to be changed from one interval to the other of the dial graduations, so as to obtain the desired effect.

The accompanying drawing shows schematically and by way of example the object of the invention.

The single figure shows in perspective view the transmission elements of the instrument as seen in section with a plane passing through the axis of the index finger.

As shown in the drawing, the apparatus comprises a cylindrical casing 1, closed by the dial 2, over which rotates the index finger 3 fixed on its spindle 4 provided with a pinion 5 meshing with a toothed sector 6 carried by a pivoted arm 7 which is actuated, at various distances from the pivot 8, by a stem 9. On the variation of this distance, for any given rotation of the stem 9 carried by and projecting radially from the spindle 10, the angular displacement of the sector 6 and consequently that of the index finger, is caused to be varied according to the height of the aircraft as desired. For this purpose, the spindle 10 may be arranged so as to slide axially along its own longitudinal axis, by an auxiliary aneroid capsule 11 adapted for altimetric correction, the deformations of which are transmitted to the spindle 10, by means of a lever 12.

While the altimetric aneroid capsule 11 is hermetically closed, the ordinary aneroid capsule 13 communicates with the anemometric tube 14. The deformations of this latter capsule are transmitted to the spindle 10 and consequently to the sector 6 by means of an arm 15 having a suitable variable curvature, projecting sideways from the spindle 10, and resting with a variable point of contact on the upper shackle or link 16 provided at the top of the aneroid capsule 13, said shackle being parallel to the axis of spindle 10. The arm 15 with a variable point of contact has the purpose of decreasing the space intervals of the graduation as the velocity and the height of the aircraft increase, so that its form will be such as to be the most convenient for this purpose.

A spring 17 enclosed in a cylinder 18 and acting on a piston 19, solicitates continuously the mechanism to return to the zero position. In order to increase the sensitivity of the instrument by reducing the friction the transmission spindle 10 rotates always on two conical supporting points. An elastic support 20 holds the aneroid capsule 13 damping the vibrations and the shocks thereof.

It is to be understood that the invention has been shown and described by way of example and that a number of variations may be made to its various parts without thereby diverting from its fundamental principle.

I claim:

In a anemometer of the character described, a casing having a dial plate with scale graduations thereon at the upper end of the casing, an index finger movable over the dial plate for indicating heights, a vertically rotatable spindle in the casing projecting upwardly through the dial plate and carrying the index finger on its upper end, a pinion fixed to the spindle within the casing, an arm pivoted at one end in the casing, a toothed segment carried by the other end of the arm and engaged with said pinion, a second arm movable along the aforesaid arm for effecting movement of the toothed sector, a rotatable and longitudinally shiftable shaft from which the second arm laterally projects, an aneroid capsule for moving said second arm by shifting said shaft longitudinally for effecting a change in transmission ratio to the index finger to obtain a correct value of the velocity reading, a curved arm projecting laterally from said shaft and a second aneroid capsule for the operation of said curved arm to effect rotation of said shaft whereby the spacing of the scale graduations on the dial plate corresponding to the various intervals of velocity decreases with an increase of velocity indication.

UGO CIAMBERLINI.